H. B. ROBISCHUNG.
BRAKE HEAD.
APPLICATION FILED APR. 23, 1908.
1,022,331.
Patented Apr. 2, 1912.
2 SHEETS—SHEET 2.
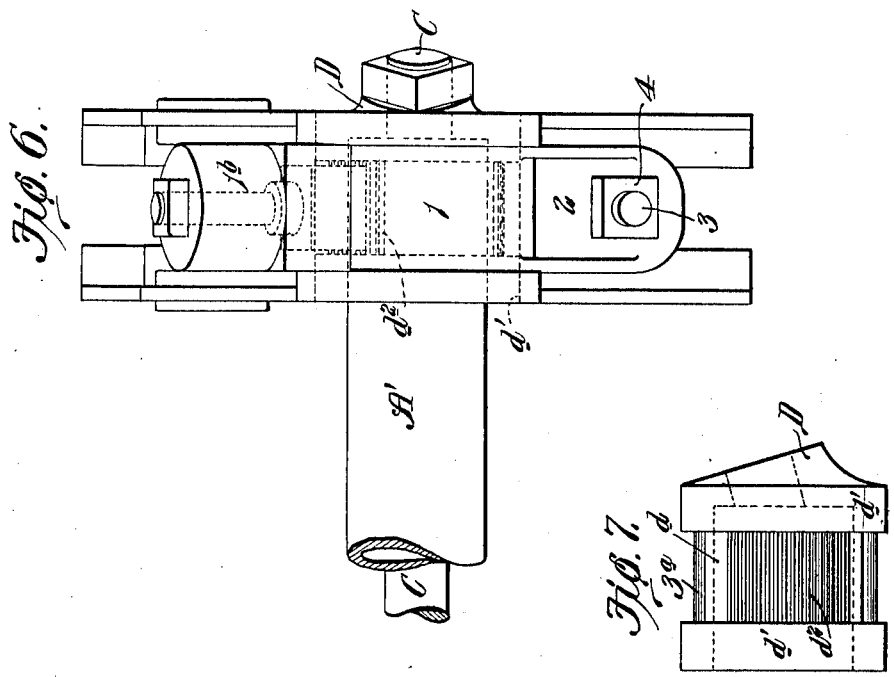
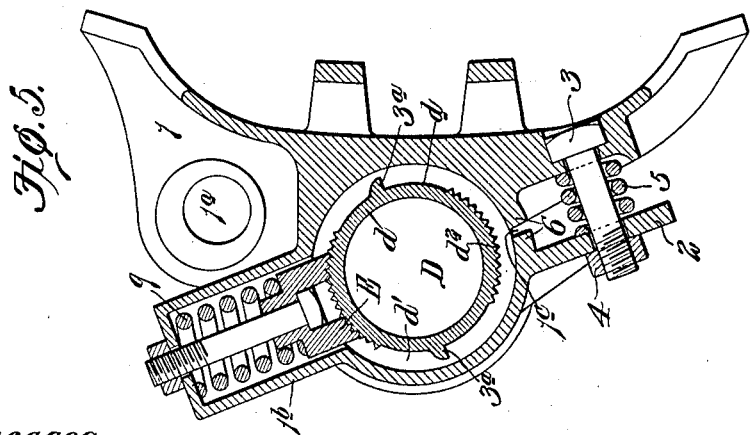
Witnesses:
Geo. R. Ladson
A. J. McCauley
Inventor,
Henry B. Robischung.
By Bakewell & Cornwall Attys.

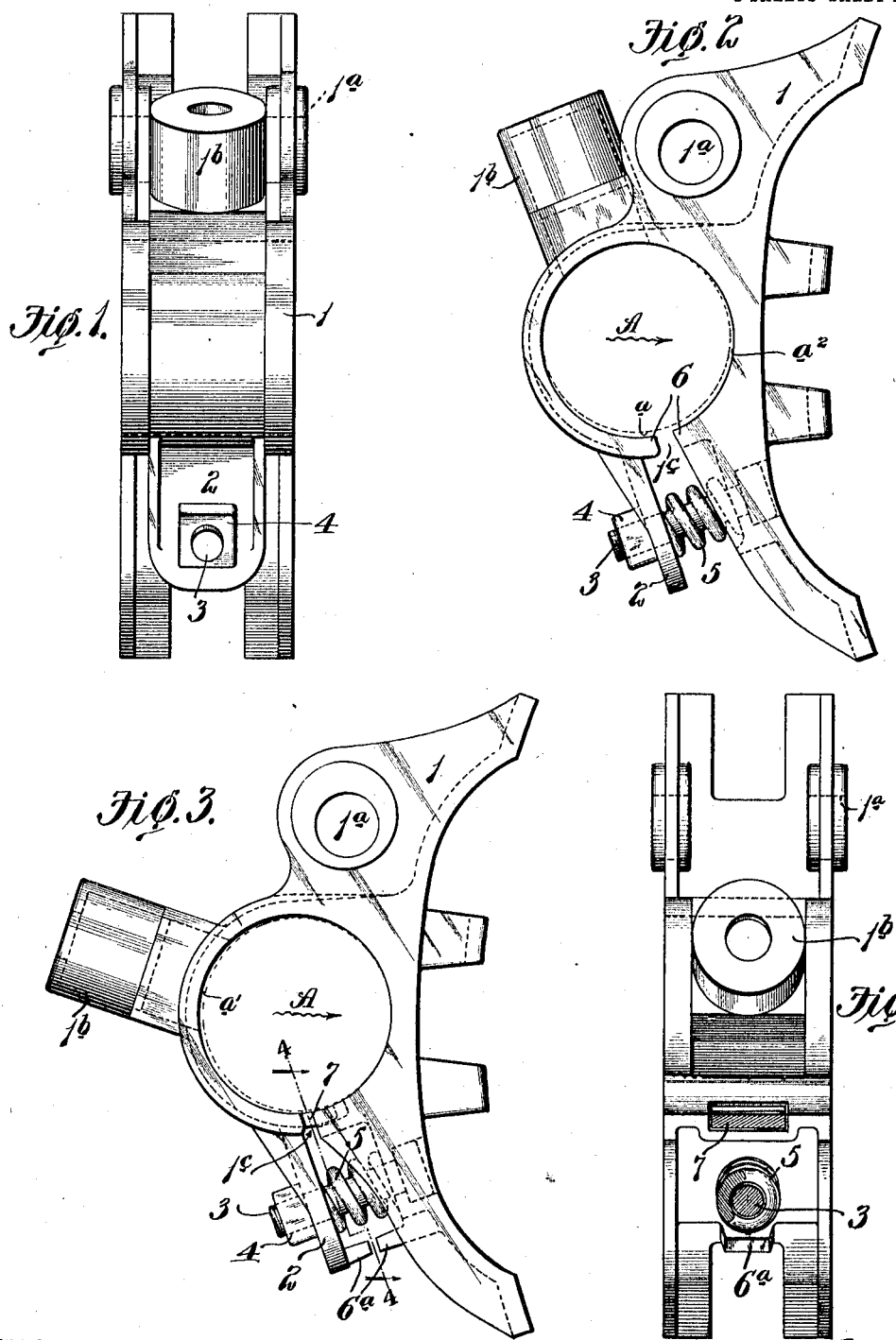

UNITED STATES PATENT OFFICE.

HENRY B. ROBISCHUNG, OF CLOVERDALE, MICHIGAN, ASSIGNOR TO CHICAGO RAILWAY EQUIPMENT COMPANY, OF CHICAGO, ILLINOIS, A CORPORATION OF ILLINOIS.

BRAKE-HEAD.

1,022,331.      Specification of Letters Patent.      Patented Apr. 2, 1912.

Application filed April 23, 1908. Serial No. 428,726.

*To all whom it may concern:*

Be it known that I, HENRY B. ROBISCHUNG, a citizen of the United States, residing at Cloverdale, Barry county, Michigan, have invented a certain new and useful Improvement in Brake-Heads, of which the following is a full, clear, and exact description, such as will enable others skilled in the art to which it appertains to make and use the same, reference being had to the accompanying drawings, forming part of this specification, in which—

Figure 1 is a rear elevational view of my improved brake head; Fig. 2 is a side elevational view of the same; Fig. 3 is a side elevational view of a modified form of brake head; and Fig. 4 is a rear elevational view, partly in section, of the same; Fig. 5 is a vertical sectional view showing the spring locking block in coöperative relation to the thrust block; Fig. 6 is a front elevational view; and Fig. 7 is a detail view of the thrust block.

This invention relates to a new and useful improvement in brake heads of that character shown in United States Letters Patent No. 485,823, granted to me November 8, 1892. In my present application, the sleeves or caps D constituting the thrust blocks which inclose the ends of the compression member A' and the tension member C of the beam are shown substantially in the form of a spool whose waist portion $d$ between the heads $d'$ is provided with corrugations $d^2$ for coöperating with the locking spring-pressed block E. This block is located on the under-side of the brake head and tends to seat the brake beam or thrust block in the upper portion of the socket in the brake head, as shown by the dotted circle in Fig. 2. As the brake head is provided with means for the attachment of a brake hanger, it follows that when the brake beam is suspended in position by hangers connected to the brake head, the weight of the brake beam and its connected levers tends to overcome the pressure of the spring 9, as contemplated in my aforesaid patent, that is, on the under-side of the brake head, and I therefore propose, in this present application, to get rid of the clearance space $a$, shown in Fig. 2, and arrange the spring-pressed block on top, or to the rear, of the brake head, so that the clearance space will be at the back of the brake beam as shown at $a'$, see Fig. 3 of the accompanying drawings. Furthermore, in my aforesaid Patent No. 485,823 this clearance space, at the point marked $a^2$ in Fig. 2 of the accompanying drawings, had to be taken up before pressure could be applied to the brakes, which pressure is usually applied in the direction of the arrow A. While this lost motion between the brake head and the beam at this point is trifling, it will of course be appreciated that it is multiplied a number of times so far as the stroke of the piston is concerned, and consequently the piston in the brake cylinder must of necessity move a greater distance in applying the brake, in order to take up this lost motion between the brake head and the brake beam.

By referring to Fig. 3 it will be observed that the arrangement of the spring-pressed block at the rear side of the brake head causes the brake beam to be seated against the front wall of the socket in the brake head, and consequently there is no more lost motion to be taken up between these parts when the brakes are applied.

I do not claim in this present application the location of the spring-pressed locking block as the same forms the subject-matter of a companion application filed by me of even date herewith. I might say that the spring-pressed locking block may be located at any point in the brake head, so far as my present invention is concerned, as, according to the construction shown in the drawings, means are provided for taking up this clearance between the brake head and the brake beam, or part of the brake beam on which the brake head is mounted, so that there will be no clearance space and consequently no rattling of the parts, and no lost motion to be taken up when the brakes are applied.

I accomplish the above object by dividing the wall of the socket of the brake head and providing the free end of said wall with a lug or ear which affords a seat for a nut on a bolt attached in some suitable manner to the brake head. When this nut is screwed down the diameter of the socket is diminished, and thus all clearance spaces are eliminated when the brake head is clamped in position on the part of the brake beam on which it is mounted. I prefer to surround the clamping bolt with a spring so that the socket will open up when the clamping bolt is loosened and permit the removal of the brake head from the beam. I also provide a stop to limit the movement of the free member of the socket.

In the drawings I have shown, for illustrative purposes, a brake head 1 of the well-known "Christie" type, the jaws and lugs thereof conforming to the templet requirements prescribed by the Master Car Builders' Association. This brake head 1 is provided with an opening $1^a$ for the attachment of the brake hanger, and is also provided with a circular socket for the reception of the brake beam or part of the brake beam on which the head is mounted. It is obvious, however, that the shape of the socket could be changed without departing from the nature and spirit of my invention.

$1^b$ is a spring housing extending from the socket in which is intended to be mounted the locking block illustrated in my Patent No. 485,823 before referred to. The walls of the socket of the brake head are divided at some convenient point, as at $1^c$, part of the metal being removed so as to permit the diameter of the socket to be reduced. From the end of the socket wall which might be termed "free," there extends a lug or ear 2.

3 indicates a bolt whose head is seated in one of the jaws of the brake beam and which extends through the lug or ear 2, receiving a nut 4 on its threaded end.

5 is a spring whose energies are exerted between the jaw of the brake head and the lug 2 to separate said parts.

6 is a stop to limit the closing movement of the free end of the socket wall.

In practice, the brake head is constructed as shown in Fig. 2, and the diameter of the socket opening is such that it may be readily slipped in position on the brake beam or part of the brake beam coöperating therewith. When the brake head is in position the nut 4 is screwed down, pressing the spring 5 and causing the stops 6 to approach each other, the reduced diameter of the socket taking up all clearance space. The stops 6 are intended to contact when the interior perimeter of the socket is in surface contact with the part of the brake beam on which the brake head is mounted, and any further turning of the nut 4 inwardly will cause the stops 6 to act as fulcrums and permit slight giving of the parts, which will prevent breakage.

In Figs. 3 and 4 I have shown a tongue 7 bridging the space $1^c$ so as to provide a continuous inner wall for the socket. The stops $6^a$ in this form are located below the nut 4, instead of above the nut, as shown in Fig. 2, and consequently when these stops $6^a$ are in contact and act as fulcrums the leverage on the lug 2 is of different character, to wit, of the second order, instead of the first order shown in Fig. 2.

In Figs. 5, 6, and 7 I have shown the brake head as being arranged upon the thrust block in my aforesaid Patent No. 485,823. In Figs. 5 and 7 I have shown the thrust block D, which is sometimes called a sleeve, as being provided with lugs $3^a$ in its waist portion according to my aforesaid patent, for the purpose of limiting the rotation of the head.

By the construction above described it will be noted that the locking block E is being pressed by spring 9 against the corrugations in the waist portion of the thrust block, but there is little tendency of the brake head to be changed from its angular adjusted position; and, furthermore, the location of this locking block between the flanges $d'$ prevent axial displacement of the head.

In applying the brake head, the parts are assembled in the relation shown in the drawings, but with the clamping bolt 3 loosened, and the spring 9 compressed, with the locking block retracted within its housing. Under these conditions the brake head is free to rotate on the end of the beam and adapt the position of its brake shoe (not shown) to the tread of the wheel with which it is to coöperate. The brake may then be drawn up tightly so that the brake head will assume the proper angular position, and while the brakes are on, the locking block E is released and the clamping bolt 3 screwed up tight. Screwing up the bolt 3 and tightening the socket of the brake head changes the transverse dimensions of the walls of said socket relative to the part of the beam (thrust block) on which the brake head is mounted, and thus the brake head is caused to bind in its assembled relation, and maintain the angular position to which it is adjusted.

I am aware that minor changes in the construction, arrangement and combination of the several parts of my device can be made and substituted for those herein shown and described without in the least departing from the nature and principle of my invention.

Having thus described the invention, what is claimed as new and desired to be secured by Letters Patent is:

1. A brake head provided with a socket, one wall of which socket is yielding, and means for moving said socket wall in both directions; substantially as described.

2. A brake head having a socket, one wall of which socket is yielding, means for positively moving said socket wall in one direction and a spring for moving said wall in the opposite direction; substantially as described.

3. A brake head having a socket, one wall of which socket is yielding, yielding means for forcing said movable socket wall outwardly, and positive means for forcing said movable socket wall inwardly; substantially as described.

4. A brake head having a socket, one wall of which socket is yielding, means for moving said yielding socket wall in both directions, and a stop for limiting the amount of movement of said socket wall; substantially as described.

5. A brake head having a split socket, stops at the split of said socket for limiting the inward movement of the parts, and means coöperating with projections extending from the walls of said socket, beyond said stops, for drawing the split end of the socket walls together.

6. A brake head having a circular split socket, a lug on the "free" socket wall, a nut and bolt coöperating with said lug, and a spring interposed between said lug and said brake head; substantially as described.

7. A brake head having a circular split socket, a tongue bridging said socket so as to form a continuous inner wall, and means coöperating with one wall of said socket so as to change the diameter of the socket opening; substantially as described.

8. A brake head having a clamping arm, and a spring connected with one end of said arm and tending to move said arm.

9. A brake head having a hub, a clamping arm at one side of said hub, and a spring connected with one end of said arm and tending to move said arm.

In testimony whereof I hereunto affix my signature in the presence of two witnesses, this fifth day of July 1907.

HENRY B. ROBISCHUNG.

Witnesses:
 HUGH F. CAMPBELL,
 J. O. CHONSHERT.

Copies of this patent may be obtained for five cents each, by addressing the "Commissioner of Patents, Washington, D. C."